United States Patent [19]
Van de Walker et al.

[11] 3,837,772
[45] Sept. 24, 1974

[54] APPARATUS FOR MOLDING ARTICLES CONTAINING INSERTS AND MEANS FOR FEEDING INSERTS TO THE MOLD

[75] Inventors: Roger D. Van de Walker; Blair E. Howe, both of Costa Mesa, Calif.

[73] Assignee: California Injection Molding Co., Inc., Costa Mesa, Calif.

[22] Filed: Nov. 24, 1972

[21] Appl. No.: 309,202

Related U.S. Application Data
[62] Division of Ser. No. 79,191, Oct. 8, 1970, Pat. No. 3,719,396.

[52] U.S. Cl. ............... 425/126, 198/24, 214/1 BT, 425/249
[51] Int. Cl. ............................................. B29c 1/06
[58] Field of Search ........ 425/123, 249, 126 R, 125, 425/129, DIG. 60; 264/90, 268; 198/24; 214/1 BT, 1 BS, ; 302/2 R

[56] References Cited
UNITED STATES PATENTS
2,380,042   7/1945   Hauton ............................. 425/129

FOREIGN PATENTS OR APPLICATIONS
1,020,193   2/1966   Great Britain

*Primary Examiner*—J. Spencer Overholser
*Assistant Examiner*—David B. Smith
*Attorney, Agent, or Firm*—Gausewitz, Carr & Rothenberg

[57] ABSTRACT

Apparatus for mass-manufacturing elongated hollow plastic objects, such as covers for electronic thermometer probes, and ball point pens, having inserts at the ends thereof. The inserts are automatically loaded, by vibrating the same into pockets and then lifting them out of the pockets into suction tubes which pass through a horizontal transfer plate into nests in a vertical transfer plate. Vacuum is employed to maintain the inserts in the nests during movement of the vertical transfer plate to positions adjacent the distal ends of hollow core pins through which air is sucked. The vacuum in the vertical transfer plate is then converted to pressure to cause the inserts to fly across the air gaps to the core pin ends, following which the inserts are maintained on such ends by suction. The mold is then closed to cause the inserts to engage spring-biased plungers, following which the plastic is injected.

16 Claims, 19 Drawing Figures

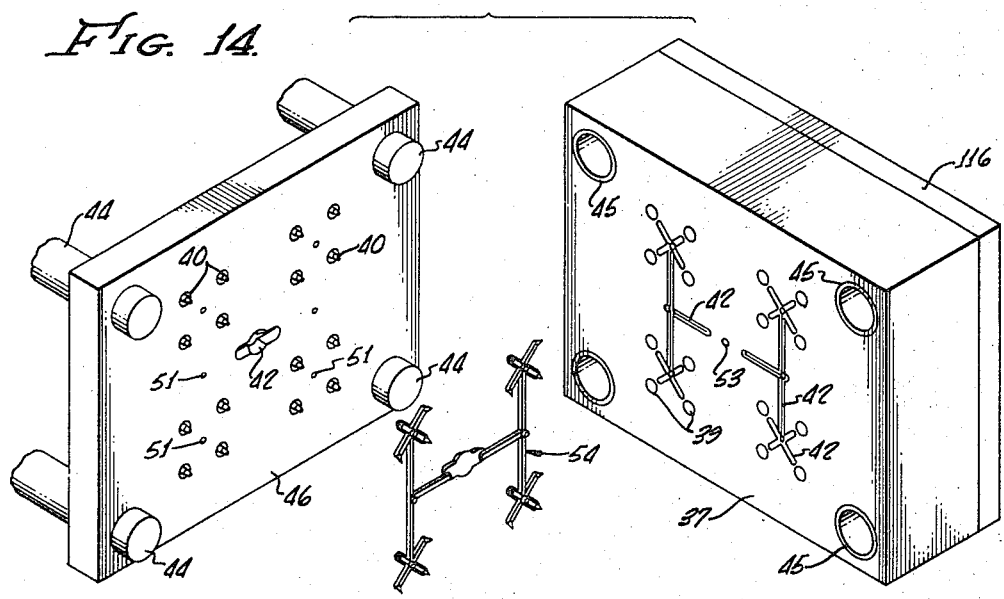
FIG. 14.
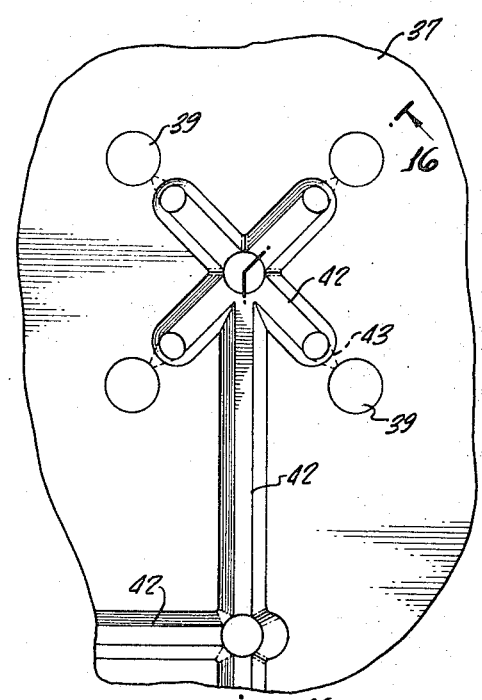
FIG. 16.
FIG. 15.

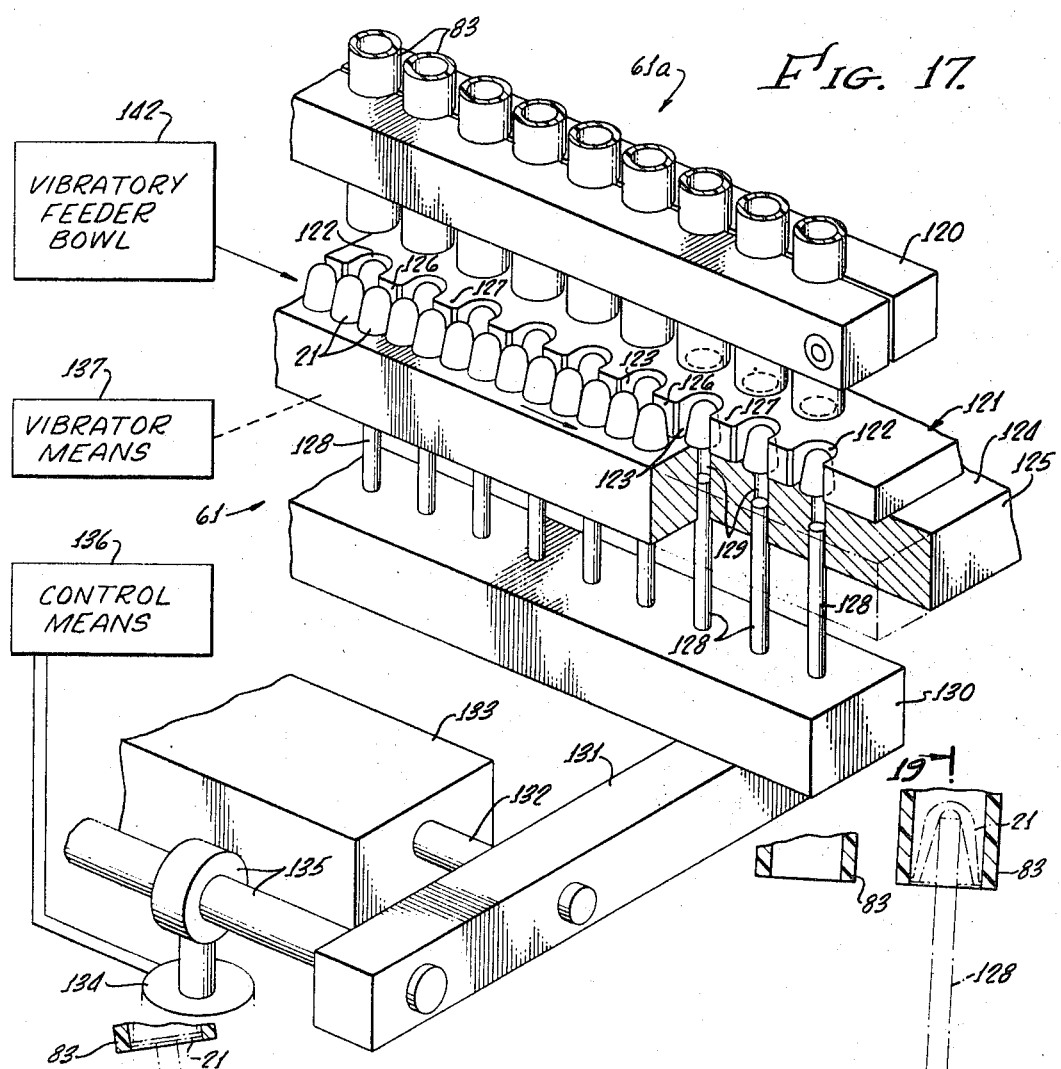

APPARATUS FOR MOLDING ARTICLES CONTAINING INSERTS AND MEANS FOR FEEDING INSERTS TO THE MOLD

This is a division of application Ser. No. 79,191, filed Oct. 8, 1970, now U.S. Pat. No. 3,719,396, granted Mar. 6, 1973.

BACKGROUND OF THE INVENTION

1. Field of the Invention

This invention relates to the field of injection molding machines and the like, and of apparatus and methods for effecting automatic loading of inserts into the molds of such machines.

2. Description of Prior Art

The feeding of inserts into molding machines for ball point pens is the subject of U.S. Pat. Nos. 2,380,042 and 2,896,250. In addition to such patents, the following patents disclose means for feeding inserts into injection molding machines: U.S. Pat. Nos. 2,518,850; 2,579,951; 3,018,519; 3,293,693; 3,423,792.

The following patents relate to the pneumatic feeding of articles for various purposes other than injection molding: U.S. Pat. Nos. 3,275,191; 3,410,607; 3,448,236.

SUMMARY OF THE INVENTION

Stated generally, one aspect of the invention relates to a relationship between pockets, combination gate and lifting fingers, vacuum passages and vibratory-feeder means adapted to effect automatic loading of inverted cup-shaped inserts through suction tubes into individual nests in a vertical transfer plate. In passing through the tubes into such nests, the inserts travel through a horizontal transfer plate adapted to move horizontally between a position closely adjacent the vertical transfer plate and a position spaced therefrom. In accordance with another aspect of the invention, the inserts are maintained in such nests by means of suction and during movement of the vertical transfer plate from a loading position to a discharge position registered with elongated hollow core pins. When the vertical transfer plate is in discharge position, the inserts are propelled through the air across a space between the nests and the core pins, such propulsion being effected by an air blast applied to the nests. Air is sucked through the hollow core pins in order to provide combined effects including cooling of such core pins, thus eliminating the need for water cooling, and maintaining the inserts on the core pin ends during closing of the mold. The inserts seat on biased piston elements adapted to provide sealing functions and also ejecting functions.

BRIEF DESCRIPTION OF THE DRAWINGS

FIG. 14 is an exploded schematic view of the mold elements, the stripper plate being shown in stripping position;

FIG. 15 is an enlarged fragmentary view of the face of the female mold element;

FIG. 16 is an enlarged fragmentary view, primarily in section, showing the parting-line region of the mold when in closed condition;

FIG. 17 is a schematic representation of the vibratory supply (feeding and loading) means which is indicated in diagrammatic block form at the upper left portion of FIG. 1;

FIG. 18 is an enlarged fragmentary view of the supply means, partially in elevation and partially in section; and FIG. 19 is a transverse sectional view on line 19—19 of FIG. 18.

GENERAL DESCRIPTION OF A PREFERRED EMBODIMENT

Although it has various other important uses, such as (for example) in the manufacture of ball point pens, the present method and apparatus will be described in connection with the manufacture of elongated hollow covers 20 (FIG. 7) for the probes (not shown) of electronic thermometers. Such electronic thermometers are adapted to determine the temperatures of patients in hospitals, etc., in an extremely short period of time and with digital instead of analog readout. Prior to the taking of the temperature of each patient, one of the present covers 20 is mounted over the probe, following which a metal insert 21 at the end of the probe cover is touched to the tongue of the patient, following which the digital readout is noted and the probe cover thrown away or recycled.

In the manufacture of such a product, and in the manufacture of other products such as ball point pens, it is extremely important that the cycle time of the molding apparatus be minimized. With the present method and apparatus, the cycle time in the mold may be reduced to approximately 15 seconds or less, which means that a sixteen-cavity mold may produce one of the present probe covers each second.

Figure 10:
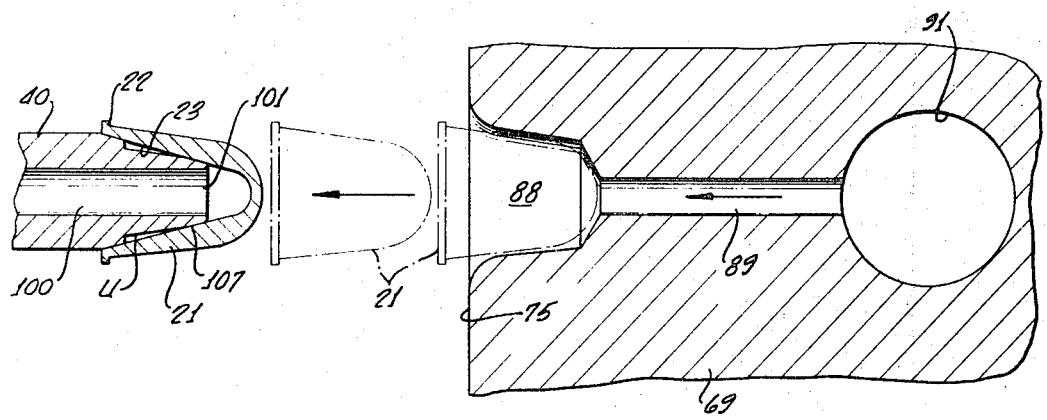
FIG. 10 is an enlarged, fragmentary, horizontal sectional view showing how the inserts are propelled through the air from their nests in the vertical transfer plate to seats on the distal ends of the core pins.

As best shown in FIG. 10, the inserts 21 are generally cup-shaped objects each having a varying wall thickness. The wall thickness is such as to make the inserts nose-heavy and very unstable, so that they tip over easily when fed along a vibratory surface as described relative to FIGS. 17–19. The varying wall thickness of each insert 21, and the cup shape thereof, are such as to tend to make the inserts fly through the air with their noses oriented forwardly instead of rearwardly.

Each insert 21 is very small and light. For example, each insert may weigh 0.03 grams. The diameter of the rim or mouth portion of each insert may be 0.150 inch, whereas the length of each insert may be 0.175 inch. The inserts are formed of aluminum.

Provided at the rim of each insert, as shown in FIG. 10, is a radially-outwardly extending bead or flange 22 adapted to be embedded in the plastic which is molded in manufacturing the probe cover 20. The interior wall of each insert 21 is generally conical, as indicated at 23. Such conical relationship tends to cause the inserts to stack and nest relative to each other if they are not maintained spearate at all times. After any such stacking it is very difficult to separate the inserts from each other.

The plastic body 24 (FIG. 7) of each probe cover 20 is generally tapered, the end of the probe cover remote from insert 21 being open. The body is provided with a step or shoulder at 25. The body 24 may be formed of a suitable molding material, namely a thermoplastic synthetic resin such as medium-impact styrene.

The apparatus employed for mass-manufacturing the probe covers 20 includes an injection molding machine (press) which may be of various constructions. The injection molding press schematically illustrated in the present drawings includes a fixed support 27 (mounted by suitable means, not shown) which is rigidly secured by tie bars 28 to the stationary platen 29 of the press. The moving platen 31 of the press is adapted to slide on the tie bars 28 when actuated by an actuating means such as the hydraulic cylinder 32 shown in FIG. 1. Cylinder 32 has an associated piston rod 33 (FIG. 2) which extends slidably through support 27.

It is to be understood that the present showing is only schematic, and that the cylinder 32 may actually comprise a more complex toggle mechanism adapted to apply great pressures to the moving platen 31. The cylinder 32 or other actuating means is suitably controlled by the molder control means represented in block form (FIG. 1) at 34.

The control means 34, like all of the control means schematically represented in the present application, preferably forms part of a unitary over-all control circuit which makes the entire operation fully automatic, so that the operator merely stands by the machine and watches for malfunction. Since such over-all control circuit and mechanism form no part of the present invention, and since the various control operations for the cylinder 32 and other portions of the apparatus may be performed by hand (as by the operator's actuation of suitable valves and switches), no description of the over-all control circuit will be provided.

The side of the press incorporating the stationary platen 29 is normally the "hot side of the press". Such hot side incorporates the feed hopper for the plastic, the heating means for the plastic, and the plastic extruder which forces hot plastic into the mold means described hereinafter. Referring to the right side of FIG. 2, a portion of the extruder and associated nozzle is represented at 35. These elements are associated with an injection control means represented in block form at 36, such means determining the amount of plastic which is injected and also determining the times of injection (preferably under the control of the over-all automatic control circuit indicated above).

A first (female) mold element 37 is fixedly mounted on the stationary platen 29, this being the element which defines the elongated parallel cavities 38 in which the probe covers 20 are molded. Such cavities have mouth portions 39 disposed remote from the stationary platen 29 and respectively adapted to receive elongated core elements (core pins) 40. Such core elements or pins 40 are prallel to each other and are registered with the cavities 38, being mounted in cantilevered relationship on a second (male) mold element 41 which is rigidly supported on the moving platen 31.

In the illustrated mold means 37–41 there are sixteen cavities, it being understood that a greater or lesser number could be employed. The 16 cavities are provided in four vertical rows (FIG. 14) with four in each row. The mole 37 (and the ejector plate described below) are provided with suitable means to conduct hot plastic from the extruder and nozzle means 35 (FIG. 2) to the various cavities 38. Such means includes runners 42 (FIGS. 14–16) and tunnel gates 43.

The second or male mold element 41 is on the ejector side of the press (as distinguished from the hot side thereof). Such element 41 not only mounts the core pins 40 but also mounts leader pins 44 adapted to be introduced into bushings 45 (FIGS. 5–7) in mold element 37 in order to maintain the molds in precise alignment.

Figure 2:
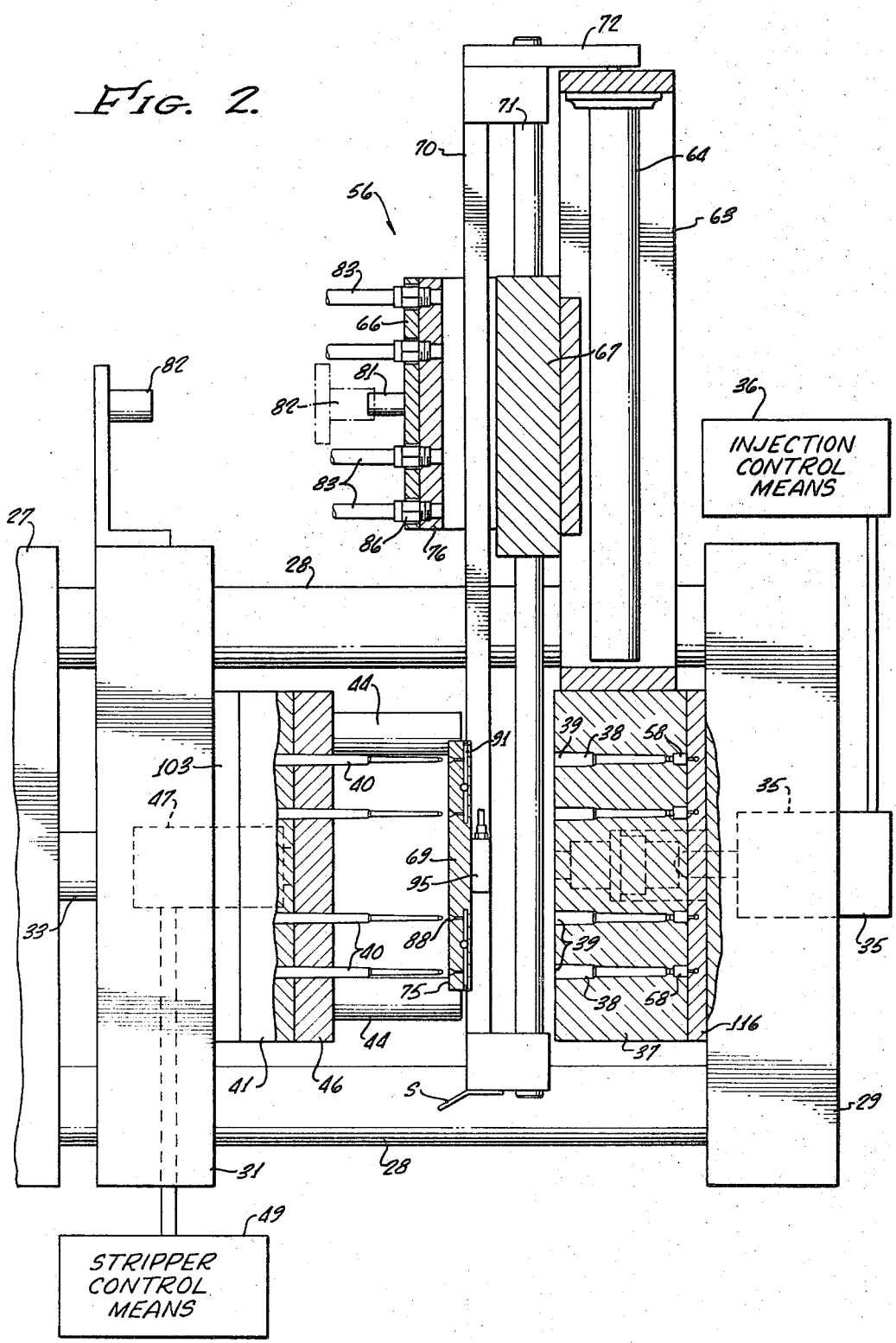
FIG. 2 is a view, partially in side elevation and partially in vertical section, showing the vertical transfer plate in its discharge position between the mouths of the mold cavities and the distal ends of the core pins.
Figure 3:
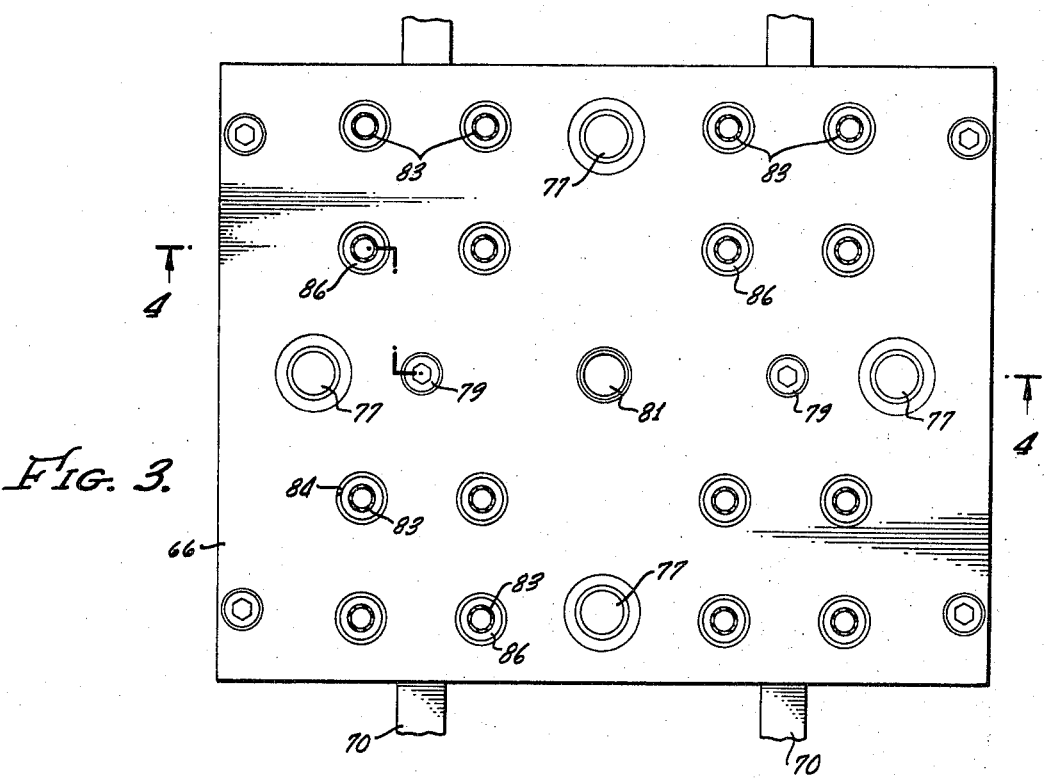
FIG. 3 is an elevational view showing an outside surface of the loader box which is adapted to receive the vertical and horizontal transfer plates, as viewed from the upper left in FIG. 2.

The leader pins 44 perform the additional function of mounting in sliding relationship a stripper plate 46 having openings therein through which the core pins 40 project. The stripper plate 46 is operated between a retracted position (FIG. 5) and an extended position (FIG. 7) by means of one or more cylinders 47 shown schematically in FIG. 2. A suitable control means, indicated in block form at 49 in FIG. 2, is associated with cylinders 47 in order to control the operation thereof. The stripper cylinders 47 are mounted on the moving platen 31, by suitable means (not shown), and have rods which connect to plate 46.

Figure 6:
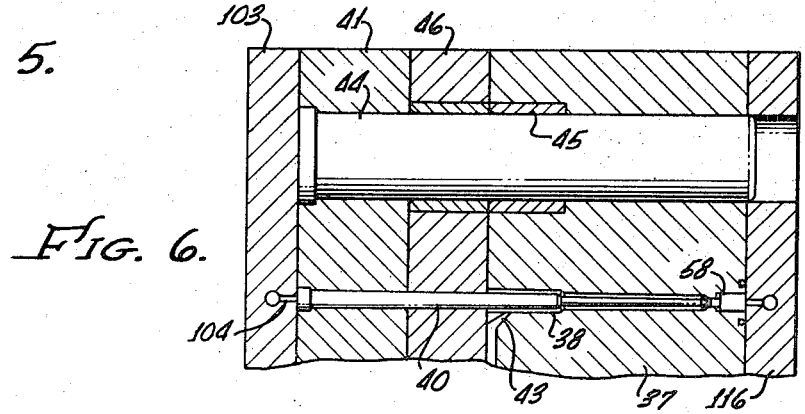
FIG. 6 corresponds to FIG. 5 except that it shows the mold in closed condition, the schematic showings of the vacuum source and the fluidics being omitted.

Plate 46 operates not only as a stripper but as part of the mold means, since it closes the mouths of cavities 38 when the mold means are closed as shown in FIGS. 6 and 16. The openings in plate 46 then receive the core elements 40 in very snug-fitting relationship.

In addition to the core pins 40 and leader pins 44 which are mounted in cantilevered relationship on male mold element 41, puller pins 51 (FIG. 16) are mounted thereon and extend slidably through corresponding bores in the stripper plate 46. The puller pins have tapered end portions 52 which are provided with undercut grooves and which extend into certain regions of the runners 42 when the mold means are closed (FIG. 16).

In the operation of the apparatus as thus far described, and without reference to the various apparatus and mechanisms associated with the inserts 21, the hydraulic cylinder 32 (FIG. 1) is operated by control means 34 to shift its piston rod 33 (FIG. 2) and thus movable platen 31 to the right until core pins 40 are inserted into the elongated mold cavities 38 as shown in FIGS. 6 and 16. The stripper plate 46 is at this time fully retracted, and operates (as described above) to close the mouths 39 of cavities 38. The injection control means 36 (FIG. 2) then operates to extrude hot plastic through extruder and nozzle means 35 into a central port 53 (FIG. 14) in mold element 37. Thereafter, the plastic passes through runners 42 in both the mold element 37 and the stripper plate 46 until it reaches the tunnel gates 43 (FIG. 16) and thus fills the cavities 38. The mold element 37 is then cooled by a suitable means, not shown, which effects shrinkage of the resulting hollow plastic articles onto the core pins 40.

The molder control means 34 (FIG. 1) is then operated to pull the core pins 40 out of cavities 38 and to pull the undercut pin ends 52 (FIG. 16) out of the mold element 37. Due to the undercut relationships at the pin ends 52, there is pulled from mold element 37 the solidified runner portions shown at 54 in FIG. 14. Furthermore, the solidified hollow objects (probe covers 20) move outwardly with the core pins 40 (due to the above-indicated shirinkage thereon) and also due to the operation of spring-biased plungers described hereinafter.

Figure 7:
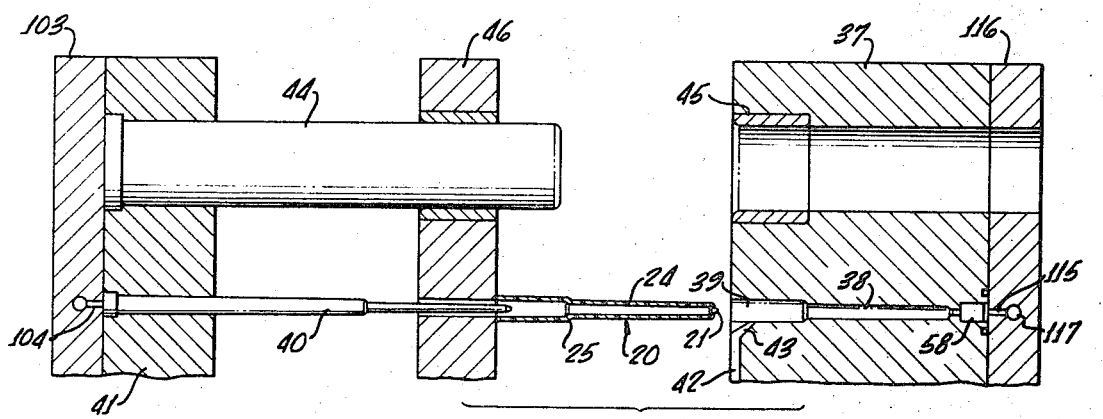
FIG. 7 corresponds to FIGS. 5 and 6 but shows the parts in the stripping position, the showings of the vacuum source and fluidics being again omitted.

The stripper control means 49 (FIG. 2) then operates the stripper cylinders 47 in such manner as to shift stripper plate 46 to the right, which strips the probe covers 20 from the core pins 40 as shown in FIG. 7. The probe covers 20 and the runner 54 (FIG. 14) then drop into a discharge chute, not shown. In the event there are any hangups, stripper means associated with the loader 56 (described hereinafter) positively actuate the elements down into the chute. During the described ejector operations, the element 54 (FIG. 14) is severed from the probe covers 20 by shearing at the small-diameter ends of the tunnel gates 43.

The above description of the operation of the injection molding press, without reference to the inserts 21, is given in order to provide a better explanation of the operation of the loader means, insert-transfer means, ejector means, etc., described in detail hereinafter. Stated very generally, the apparatus for inserting the inserts 21 into the molding machine, in order that the inserts will be present in the ends of the probe covers 20 as described above, includes five main components. The first of such components is the loader, which is represented generally at 56 in FIGS. 1 and 2, and which includes components which move in and out from between the mold elements 37 and 41 in order to effect seating of inserts 21 on the distal ends of core pins 40 prior to molding. The second of such components is the means for applying vacuum or suction to the core pins 40 to draw air therethrough and thereby achieve two major results, namely: (a) cooling of the core pins in the absence of water cooling to thereby greatly shorten the cycle time of the molding apparatus, and (b) maintenance of the inserts 21 in seated positions on the core pin ends after the inserts are shot through the air from components of the loader 56. Such vacuum means is indicated schematically in various views, namely in FIG. 8 and FIG. 5, at 57.

Figure 9:
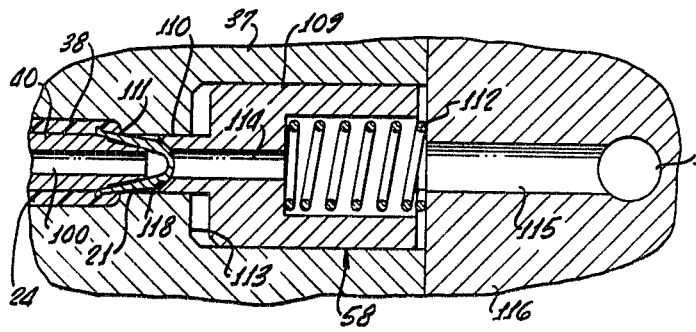
FIG. 9 is a further enlarged, fragmentary view corresponding to the right portion of the showing of FIG. 8, but after the mold elements have come fully together so that the insert is seated on the spring-biased plunger.
Figure 8:
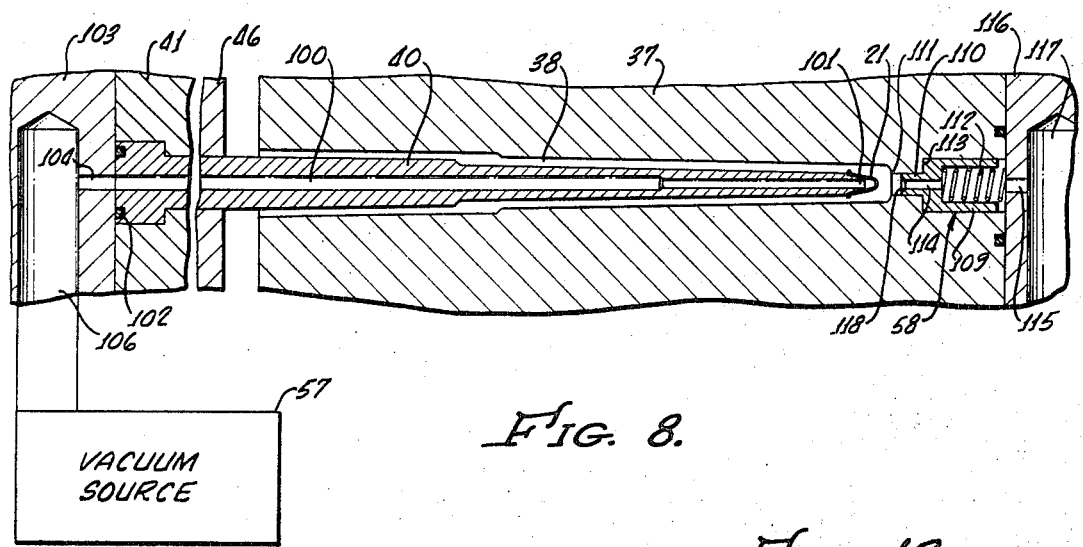
FIG. 8 is an enlarged view representing a core pin in longitudinal central section and in the position assumed immediately prior to seating of an insert on the spring-biased plunger.

The third of the indicated components is the plunger menas 58 best shown at the right in FIG. 8 and also shown in FIG. 9. Such plunger means 58 maintains the inserts 21 firmly seated on the distal ends of the core pins during molding, provides seals insuring that the pins during molding, provides seals insuring that the plastic molding material will remain in the desired locations, aids in ejecting the probe covers 20 from the mold 37, and provides communication to the fluidic sensing apparatus indicated below.

Figure 5:
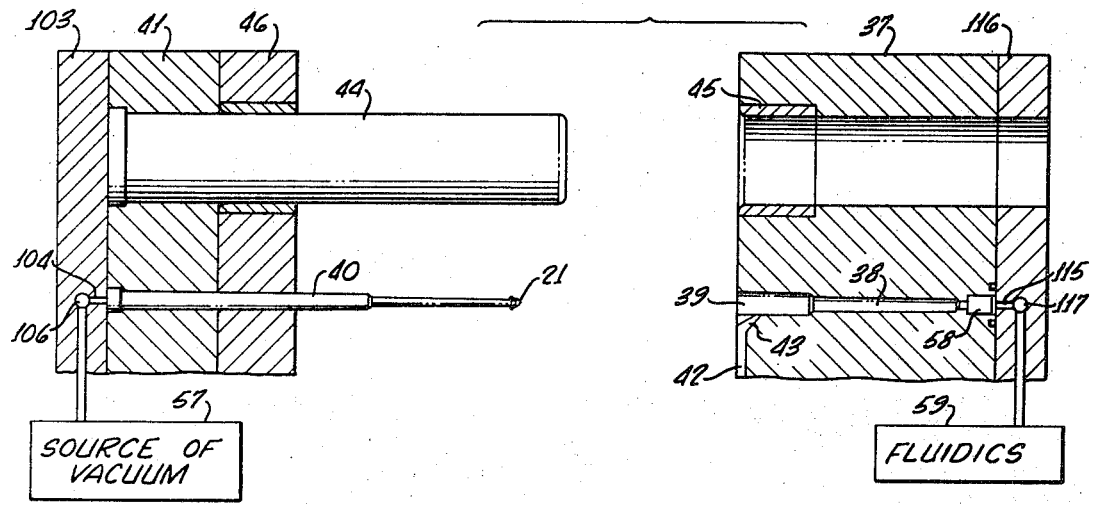
FIG. 5 is a vertical sectional view corresponding generally to a portion of the central region of the showing of FIG. 2 but after the vertical transfer plate has moved upwardly from between the molds, said figure showing schematically the fluidics and the vacuum source.

The fourth of the indicated components is the fluidic sensing and control means represented in block form at 59 in FIG. 5. Such means is critically important to the achievement of high-speed molding operations without frequent stoppages and breakdowns, and is described and claimed in copending patent application Ser. No. 79,124, filed Oct. 8, 1970 now U.S. Pat. No. 3,677,680 granted July 18, 1972, for Fluidic Sensing for Molding System, inventor Roger F. Etherington. The disclosure of such copending patent application is hereby incorporated by reference herein as though set forth in full. By use of the fluidics 59, it is assured that one and only one insert 21 will be provided on each core pin 40 prior to molding, and it is also assured that each insert will be removed from the mold element 37 subsequent to molding.

Figure 1:
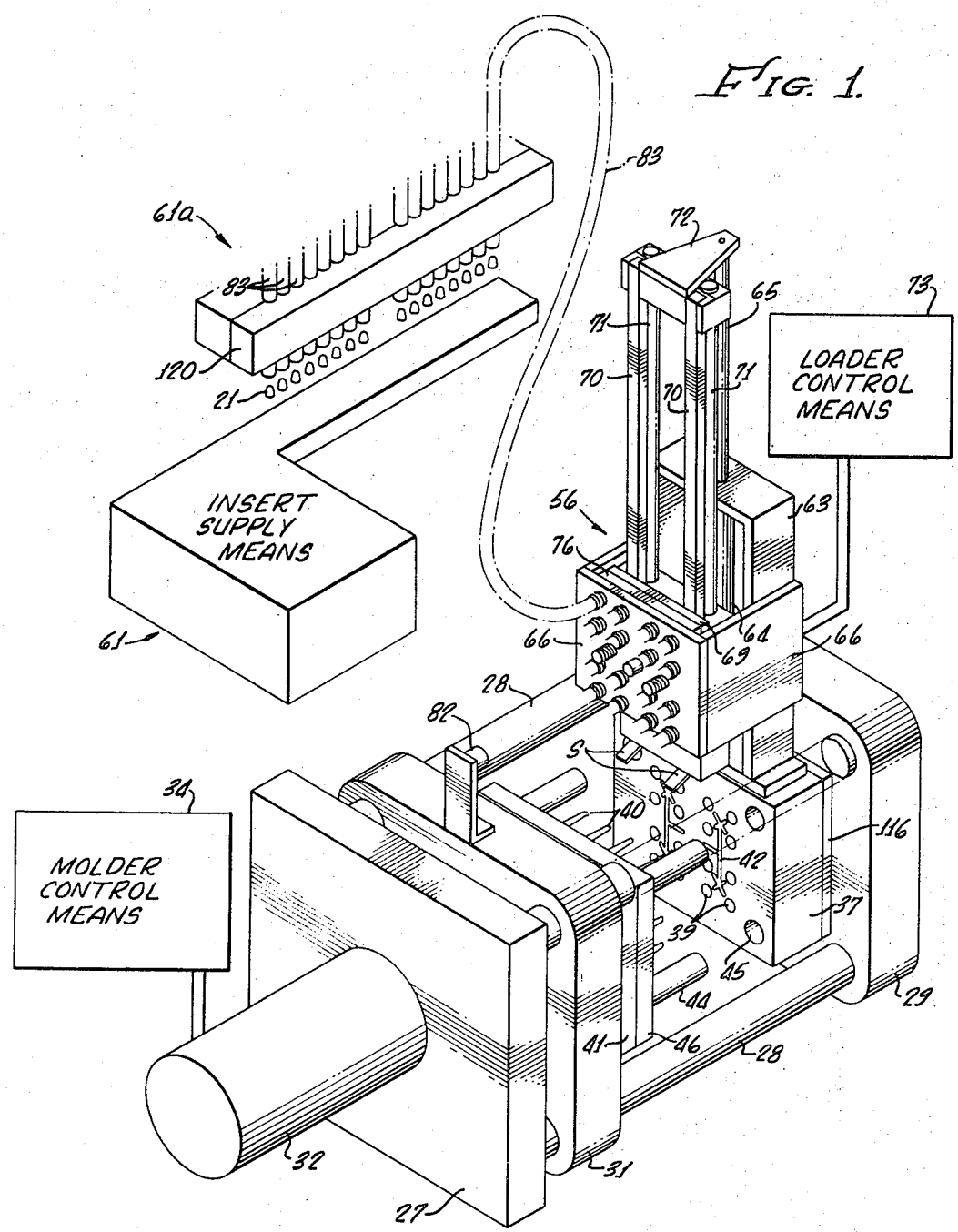
FIG. 1 is an isometric view schematically representing the injection molding machine, the transfer plates associated therewith, and the means to supply inserts to such transfer plates and thus to the core pins in the molding machine, the vertical transfer plate being in its loading position above the molds.

The fifth of the indicated components is the supply means represented schematically in block form at 61 in FIG. 1 and also at 61a in such figure. The supply means effect automatic feeding of inserts 21 to the loader means 56, and are hereinafter described in detail with reference to FIGS. 17–19 of the drawings.

The loader 56, the vacuum means including source 57, the plunger means 58, and the supply means 61 and 61a are described in detail hereinafter under separate subheadings, as are the methods associated with such components.

DETAILED DESCRIPTION OF LOADER 56 AND ASSOCIATED METHOD

The loader 56 comprises, as best shown in FIGS. 1 and 2, a vertical yoke 63 which is rigidly mounted on the upper surface of the first molding element 37. Mounted in suspended relationship from the upper (horizontal) portion of yoke 63 is a cylinder 64 the piston rod 65 of which extends slidably through such upper portion. A generally U-shaped frame or "loader box" 66 is fixedly mounted on yoke 63 and extends therefrom toward the support 27. A bearing block 67 (FIG. 2) is also rigidly secured to yoke 63.

A vertical transfer plate 69 is mounted for movement from a loading position (FIG. 1) between bearing block 67 and the opposed wall of loader box 66, to a discharge position between the distal ends of core pins 40 and the mouths 39 of cavities 38 (FIG. 2). To thus move the vertical transfer plate 69 between its loading and discharge positions, vertically-movable frames are provided and comprise vertical support members 70 to which the transfer plate 69 is secured, and vertical shafts 71 which are rigidily connected to the upper and lower ends of such support members 70. The shafts 71 extend slidably through the bearing block 67 to thereby provide a rigid relationship assuring that the vertical transfer plate 69 will be positioned precisely.

The upper ends of the vertically-movable frames formed by elements 70 and 71 are secured by a connector lug 72 to the upper end of piston rod 65 for cylinder 64, whereby operation of the cylinder will raise and lower the transfer plate 69 as indicated. Suitable loader control means, indicated in block form at 73 in FIG. 1, are associated with the cylinder 64 and also with the pneumatic circuitry associated with the transfer plate 69 and described hereinafter, to thereby control the same as indicated below.

As shown in FIG. 2, the sizes of the vertically-movable frames 70–71, and the size of the vertical transfer plate 69, are such that this assembly may readily fit between mold element 37 and the core pin ends when the mold is in the illustrated open condition. The outer face 74 (FIGS. 2, 4 and 10) of plate 69 is then spaced a substantial distance, namely approximately 2/10 inch, from the extreme distal ends of core pins 40. As described hereinafter, it is a feature of the invention that the inserts 21 are shot through the air gap across such space to the core pin ends, thereby eliminating the necessity of causing the vertical transfer plate 69 to move horizontally at any time, particularly while it is present between the mold elements 37 and 41, with consequent decreases in the expense and complexity of the apparatus and in the cycle time.

Referring to FIGS. 1 and 2, stripper lugs or ears S are mounted at the lower ends of the described vertically-movable frames. Such lugs are so positioned that they move downwardly between the vertical rows of core pins 40, thereby assuring that the probe covers 20 (FIG. 7) and runners 54 (FIG. 14) will not hang up but will instead drop out of the press.

Figure 4:
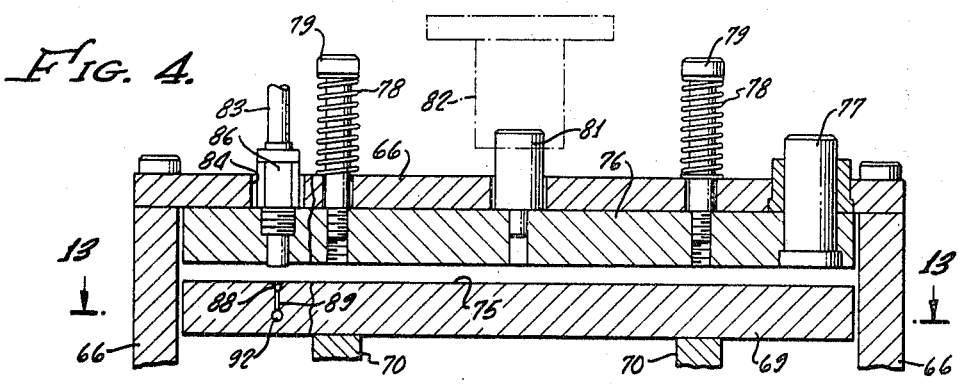
FIG. 4 is a horizontal sectional view on the broken line 4—4 of FIG. 3, the vertical transfer plate being in its loading position, the horizontal transfer plate being spaced from the vertical.

The loader apparatus 56 further comprises a horizontal transfer plate 76 which is located in the vicinity of the vertical transfer plate 69 when the latter is at its loading station (FIGS. 1 and 4) within loader box 66. Means are provided to move the horizontal transfer plate between a first station spaced from the vertical transfer plate 69 as shown in FIG. 4, and at which there is no interference with movement of the vertical transfer plate into or out of the mold, and a second station adjacent the face 75 of such plate. Such means include leader pins 77 mounted on plate 76 and extending through suitable bushings in box 66 to thereby guide the plate 76. Such means further comprise compression springs 78 (FIG. 4) which are seated between box 66 and the heads of screws 79. Screws 79 extend slidably through clearance openings in box 66 and are threaded into the plate 76. There is thus provided a bias which tends to maintain plate 76 in engagement with box 66 until the plate 76 is positively actuated toward plate 69.

The means for actuating horizontal transfer plate 76 away from the adjacent wall of box 66, and toward plate 69, includes an actuator pin 81 which extends freely through an opening (FIG. 4) in box 66. Pin 81 is adapted to be engaged and shifted by a lug 82 on moving platen 31 when the mold moves toward closed condition. The positioning of lug 82 is such that, when the mold is closed, horizontal transfer plate 76 is shifted sufficiently close to vertical transfer plate 69 that the extreme ends of suction tubes of conduits 83 will be in sealing engagement with surface 75 of plate 69 and will enclose nests in such plate 69, as shown in FIG. 12 and as described below.

Figure 12:
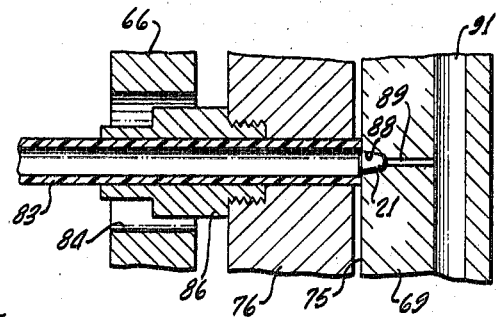
FIG. 12 is a fragmentary sectional view corresponding to a left region of FIG. 4 but showing the horizontal transfer plate after shifting thereof to the position at which the tube ends seal around the nests in the vertical transfer plate.

Referring particularly to FIG. 12, and to the left side of FIG. 4, the suction tubes 83 are plastic tubes the internal diameters of which are sufficiently large to slidably receive the inserts 21. The tubes 83 extend inwardly through oversize openings 81 in box 66 and into fittings 86 which are threaded into plate 76. The tubes 83 extend completely through the fittings 86 and through the plate 76, and extend a slight distance from the inner surface of the plate 76 for sealing contact with surface 75 of plate 69 as shown in FIG. 12. Because of the fact that the ends of the tubes 83 protrude and sealingly engage surface 75 as described, a relatively high suction may be drawn on the tubes 83 to effectively move inserts 21 therethrough over a substantial distance either vertically or horizontally.

The suction tubes 83 extend to the insert supply means 61 and 61a described below relative to FIGS. 17–19, and schematically represented in FIG. 1, which supply means 61 and 61a are preferably located at eye level or therebelow and on the floor adjacent to the molding machine. Because the appratus 61–61a is vibratory in nature, and becuase the opening and closing of the press creates shock, it is important that the means 61–61a be isolated from the press. Such isolation is effectively achieved by the tubes 83 which are the only connections between the supply means and the other components of the press.

It is emphasized that the supply means 61–61a may be located at a low level, for example four feet below the loader box 66. This is to be contrasted with various types of apparatus wherein gravity is employed to effect feeding of inserts, so that the insert supply must be at a high and inconvenient level.

Since, in the presently-illustrated apparatus, the mold employed is a 16-cavity mold, there are sixteen tubes 83 extending from the loader 56 to the supply means 61–61a. The ends of the tubes 83 remote from the loader are arranged in a row as described below, whereas the ends adjacent the loader are spaced and oriented correspondingly to the spacing and orientation of the core pins 40 and mold cavities 38.

Provided in the outer face 75 of the vertical transfer plate 69 are a multiplicity of seats or nests 88, FIGS. 4, 10 and 12, such seats or nests also serving as insert-ejecting means when plate 69 is in the discharge position of FIG. 2. The seats or nests are oriented correspondingly to the ends of tubes 83, that is to say correspondingly to the orientation of the core pins 40 and cavities 38.

As best shown in FIG. 10, each nest 88 is shaped to receive one insert 21 in relatively loose, non-binding relationship, with the rim of the insert 21 facing outwardly. Each nest 88 is sufficiently shallow that the rim of the insert 21 seated therein is disposed a short distance outwardly from surface 74. The insert rim (when the insert is seated in nest 88 as shown at the right in FIG. 10) is, for example, about 3/16 inch from a plane which is perpendicular to the axis of core pin 40, and which contains the extreme end of such core pin.

The edge portion of each nest is rounded, as shown in FIG. 10, in order to prevent damage to the inserts when they emerge from the suction tubes 83.

Each nest communicates through an elongated, relatively small-diameter passage 89 with a manifold passage 91 formed in the vertical transfer plate 69. The manifold passages 91, in turn, communicate through other manifold passages 92 and 93 (FIG. 13) WITH A CENTRAL PORT (%A LEADING TO A TWO-way valve 95.

Figure 11:
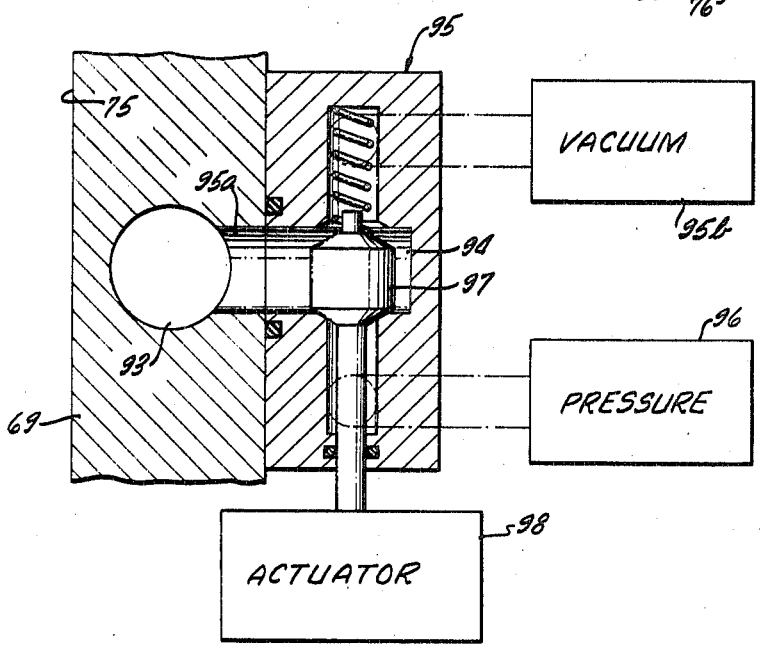
FIG. 11 is a horizontal sectional view showing schematically the valve means for effecting alternate application of vacuum and pressure to the nests in the vertical transfer plate.

As schematically represented in FIG. 11, valve 95 includes a chamber 94 which communicates through port 95a with the interconnected manifold and other passages. One end of such chamber 94 is connected to a source 95b of vacuum, whereas the other end of such chamber is connected to source 96 of pressure.

A double poppet 97 is movably mounted in the chamber 94 for actuation by an actuator 98 and an associated spring. The actuator is controlled by a suitable pilot which may form a part of the loader control means 73 illustrated in block form in FIG. 1. The vacuum source 95b is a source of relatively high vacuum, for example about 20 inches of mercury, whereas the pressure source is a source of air pressure at approximately 125 psi.

The controls for valve actuator 98 are so operated that, during the great majority of time, the double poppet 97 is in the illustrated position permitting the vacuum source 96b to communicate with port 95a and thus with the associated passages. Thus, the relatively high vacuum is drawn on the sixteen passages 89 and on the nests 88 to maintain the inserts 21 seated in such nests as desired. Furthermore, the same vacuum is operative to apply suction to the suction tubes 83 when the horizontal transfer plate 76 is in the position of FIG. 12, the ends of tubes 83 then being seated on surface 75 of the vertical transfer plate 69. As descirbed above, this suction draws the inserts 21 through tubes 83 from the insert supply apparatus 61–61a.

When the vertical transfer plate 69 is in the discharge position shown in FIG. 2, the valve means 95 (FIG. 11) is momentarily shifted from the illustrated position to the position at which the vaucum source is blocked, and the pressure source 96 communicates with port 95a and thus with the associated passages. This condition prevails for only a fraction of a second, and causes a blast of air to pass through port 95a and passages 93, 92 and 91 (FIG. 13) to passages 89 and thus to nests 88, thereby forcibly ejecting the inserts 21 from such nests and propellingthem through the air gaps to the seat means disposed opposite thereto (FIG. 10). Stated more definitely, the seat means comprises the distal ends of the core pins 40 and which are specifically adapted to maintain the inserts 21 seated, as described under the following subheading.

The passages 89 are long in comparison to their diameters, having lengths many times their diameters, in order that the air blasts therethrough will be substantially laminar. Each laminar air blast is directed to the center of each associated nest 88 to thus effectively propel the insert 21 thorugh the air without tending to cause the same to tumble. It is emphasized that the insert 21 flies rim-first or backwardly, as shown in FIG. 10, and that aerodynamic and other factors (including the relatively nose-heavy weight of the insert) tend to cause it to tumble in the air as is not desired.

Figure 13:
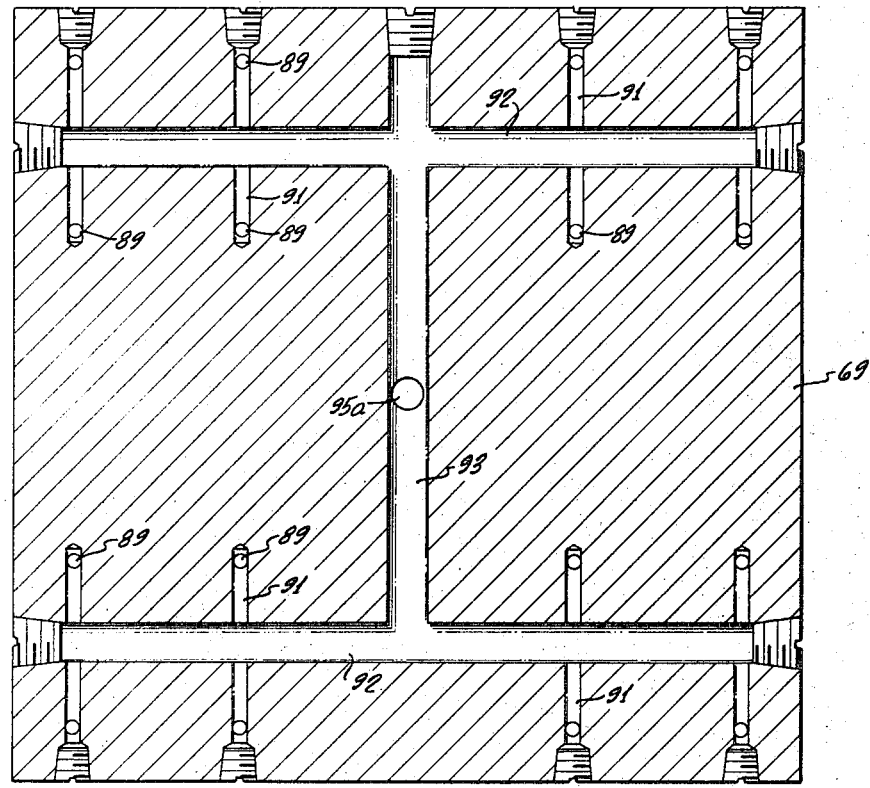
FIG. 13 is a vertical sectional view taken on line 13—13 of FIG. 4, showing the manner of distribution of air to the nests in the vertical transfer plate.

It is important that uniform air blasts be delivered simultaneously to all inserts in all of thenests 88. It is for this reason that the arrangement shown in FIG. 13 is provided, the port 95a beng centrally located and communicating through large and uniform passages with all of the passages 89 which extend to the nests 88. Since the air blasts are received simultaneously at each nest 88, there is no undesired venting or air with consequent uneven effects relative to the various inserts.

VACUUM OR SUCTION MEANS (AND METHOD) FOR COOLING THE CORE PINS 40 AND FOR MAINTAINING INSERTS 21 SEATED THEREON

Referring particularly to FIGS. 8, 10 and 5, each of the core pins 40 is cuased to be hollow, there being a bore 100 formed axially therethrough and terminating in a central openign 101 at the extreme distal end of the pin. Furthermore, as shown in FIG. 8, the case or proximal end of each core pin 40 is provided with an O-ring seal 102 and seated on a manifold plate 103. Such plate 103 has a plurality of passages 104 communicating with the respective bores 100 and also has a manifold passage 106 which communicates with the above-indicated vacuum or suction source 57. Such source 57 is a source of relatively high vacuum, such as 20 inches of mercury, and may be the same source indicated at 95b in FIG. 11.

Suction is thus applied continuously to the core pin bores 100 and effects continuous sucking of air into openings 101 and through the bores 100, thereby effectively cooling the core pins despite the absence of any cooling water passages. The necessity for providing cooling water on the ejector side of the mole is thereby eliminated, with consequent substantial simplification of the design of the modling apparatus.

It is emphasized that the cooling of the core pins is highly important since, unless the core pins are cool when the plastic is injected into the molding cavities, the plastic will nto solidify rapidly. The mold cycle time would, in the absence of effecting cooling, be greatly increased, with consequent large reduction in the production rate of each molding apparatus. As above indicated, the present molding apparatus has a cycle time on the order of 15 seconds, including all of the loading and ejecting functions and including the time required for the plastic to solidify in the mold.

As best shown in FIG. 10, the portion of the mold which provides a seat for the insert 21, after the same has been propelled out of nest 88, is the extreme distal end of the core pin 40. Such distal end has a beveled or conical surface 107 the angle of which corresponds to the angle of the interior surface 23 of insert 21. The included angle represented in FIG. 10 relative to surface 107, and also surface 23, is preferably about 15° (each of the indicated inclined lines being 7½° from the horizontal).

When the inserts 21 seat on the surfaces 107, the differential in air pressure is immediately created thereacross due to the application of suction to bores 100, and this differential in air-pressure maintains the inserts firmly in seated positions until after the core pins (with the inserts thereon) have been introduced into the mold cavities and seated on the plunger means 58 as shown in FIG. 9. This is similar to the operation whereby the inserts are maintained seated in the nests 88 due to the air pressure differential thereacross created by application of suction to the passages 89.

THE PLUNGER APPARATUS 58 (AND ASSOCIATED METHOD)

With particular reference to FIGS. 8 and 9, there is provided coaxially at the inner end of each mold cavity 38 a hollow plunger or plug 109 which is slidably mounted in a corresponding recess in mold element 37. Each such plunger has a neck 110 which extends slidably through a bore in mold 37, such bore communicating coaxially with the inner end of the carity 38 and having a diameter substantially smaller than that of such cavity. Accordingly, a shoulder 111 is provided at the intersection of the bore and the cavity 38.

Shoulder 111 has a sharp circular edge which is firmly abutted by a central region of insert 21, thereby providing an effective seal against leakage of plastic out of cavity 38. Referring to FIG. 10, the portion of seat 107 is annularly recessed at U, and directly opposite the stated sharp edge, to permit flexing of the insert body under the very large forces present in the press. It is therefore assured that the requisite seals will be formed without any damage to the inserts.

A strong helical compression spring 112 is mounted in the plunger 109 and normally maintains the plunger in its extreme left position as shown in FIG. 8, in engagement with a stop surface 113. However, upon complete insertion of the core pin 40 (with insert 21 thereon) into the cavity 38, the inner end of the insert 21 entgages the end of neck 110 and causes retraction of the plunger 109 against the bias of spring 112. The insert is thus introduced sufficiently far to create the above-stated seal at shoulder 111. The plunger is sufficiently short that it never bottoms on a manifold plate described below.

A passage 114 is provided through the neck 110 and through plunger 109, thus effecting communication between the core pin bore 100 (FIG. 8) and a port 115 when there is no insert 21 on the core pin end. The port 115 is present in a manifold plate 116 having a manifold passage 117 therein, such passage communicating (when no insert is present) with the fluidics means 59 (FIG. 5) as described in the above-cited copending patent application. The fluidics means 59 senses when an insert is absent when it should be present, and also senses when an insert is present when it should be absent.

The outer end of neck 110 is provided with a suitable seat or bevel, indicated at 118, adapted to seat the nose of the insert 21.

In operation, the plunger is engaged and retracted by the insert 21 during introduction of the core pin 40 into the cavity 38 as described above, following which the insert seats on the shoulder 111 to provide the seal. Thereafter, plastic is introduced into the cavity 38 to fill the same without flowing into the fluidics portion of the apparatus. It follows that the nose region of the insert will be exposed whereas the rim of the insert will be embedded in the plastic body 24 (FIG. 7) of the probe cover.

SUPPLY MEANS 61 AND 61a (AND METHOD)

Proceeding next to a description of the insert supply means indicated generally at 61 and 61a in FIG. 1, and shown in detail in FIGS. 17–19, the lower ends of the suction tubes or conduits 83 are mounted in a row, for example by means of the illustrated mounting block 120. The extreme lower end of each tube is disposed in the same plane as is the extreme lower end of each other tube, such lower ends being cut off perpendicularly to the tube axes. All sixteen of the tubes (for the 16-cavity mold) are indicated in FIG. 1, it being understood that the tubes and associated elements are identical relative to each mold cavity so that less than 16 may be shown in FIGS. 17–19.

An elongated comb 121 is disposed in spaced relationship beneath the plane of the lower ends of the tubes 83, and parallel to such plane. The degree of spacing is such that the suction applied to the tubes 83 as described above is insufficient to draw into the tube ends the inserts 21 therebeneath, until after such inserts have been mechanically lifted as described hereinafter. To prevent the suction from disturbing the inserts, the spacing between the lower ends of the tubes and the upper surface of the comb should be equal to about three or four insert lengths.

One edge of the comb 121 is provided with a row of pockets 122 each of which is sized to receive one and only one insert 21 when the insert is in upstanding inverted relationship as illustrated. The inserts are referred to as being generaly "cup-shaped" and "inverted" since the rim of the "cup" faces downwardly. Such pockets have openings or mouths 123 which permit the inserts to move transversely into pockets 122 from a row of inserts. The pockets are sufficiently deep that each insert substantially completely fills the associated pocket in which it is disposed.

The indicated row of inserts is provided on the upper supporting surface 124 of a support plate 125, which supporting surface is immediately beneath the comb 121. The inserts when moving in the indicated row along such support surface 124 are in abutment either with inserts 21 already disposed in the pockets 122, or else with abutment surfaces 126 which are provided at the ends of the teeth 127 of the comb 121. Such abutment surfaces 126 are substantially parallel to the row of inserts 21. Alternatively, and as described below, some of the inserts in the row (outside the comb pockets) are in abutment with combination gate and lifter elements when the latter are in their upper positions as shown in phantom lines in FIGS. 18 and 19.

It will thus be seen that the inserts 21 are disposed in a first row when they are outside the comb, and are disposed in a second row when they are in the pockets 122 in the comb, such second row being parallel to the first row and laterally offset therefrom. When in the second row, the inserts in the pockets 122 are beneath the lower ends of the suction tubes or conduits 83, such lower ends being respectively registered with the pockets 122.

Combination lifter and gate elements, indicated above, are provided in the form of fingers or pins 128 which extend upwardly through bores 129 in support plate 125, the diameters of the pins being much smaller than the sizes of the pockets 122 whereby the bores 129 will not interfere with support or movement of the inserts 21 on support surface 124. Each pin 128 is registered with the center of an associated pocket 122.

The fingers or pins 128 are mounted on a connector bar 130 which is, in turn, pivotally supported on lever means 131, the latter being pivoted or fulcrumed at shaft 132 on a support block 133. Actuator means, such as the illustrated cylinder 134, is adapted through connector means 135 to pivot the lever means 131 and thereby lift the bar 130 and all of the fingers or pins. The upper ends of the pins then enter the open bottoms of the inverted cup-shaped inserts, and lift such inserts to the positions shown in phantom lines in FIGS. 18 and 19. The suction applied to the tubes 83 as described above is then sufficient to suck the inserts off the pins and thereafter draw the inserts through the tubes 83 to the seated positions in the nests in vertical transfer plate 69 (FIGS. 12 and 10).

The cylinder 134 is controlled by suitable control means, shown in block form at 136 in FIG. 17, and which is part of the over-all control system mentioned above. The pins 128 move upwardly sufficiently far that the rims of the inserts substantially reach the plane of the lower ends of the tubes.

The row of inserts shown at the left in FIG. 17, and which is disposed outside of and adjacent the comb 121, moves continuously along such comb and longitudinally thereof due to the operation of a vibrator means 137 which is associated with the plate 125 and effects continuous low-amplitude vibration thereof. Such vibration causes the row of inserts 21 to move along the comb (in a direction to the right as viewed in FIG. 17) due to the fact that the upper support surface 124 is inclined somewhat from the horizontal, so that the inserts move down hill. Referring to FIG. 18, the line 138 represents the horizontal whereas the line 139 is dipsosed in the same plane as the upper surface 124 of plate 125. The angle of incline indicated by lines 138 and 139 may be approximately three degrees.

Correspondingly, the upper surface 124 is inclined in a direction at right angles to the longitudinal incline described relative to FIG. 18, and as shown in FIG. 19. Thus, in such FIG. 19 the line 140 represents the horizontal whereas the line 141 represents the incline of the upper surface 124, such incline being sloped downwardly toward pockets 122 whereby the vibrating plate 125 will tend to cause the inserts to enter through openings 123 into pockets 122. Such incline may be, for example, approximately 9°.

The inserts 21 are fed to the left end of the row in FIG. 17 from a vibratory feeder bowl 142 which may be of various constructions. Reference is made to column 24 of U.S. Pat. No. 3,293,693, starting at line 7 and ending at line 25. Such portion of U.S. Pat. No. 3,293,693, the drawings referred to in such portion, and the patents cited in such portion, are hereby incorporated by reference herein as though set forth in full.

In the operation of the feeding apparatus of FIGS. 17-19, the vibratory feeder bowl supplies inserts continuously to the left end of the row illustrated in FIG. 17, following which the vibration of plate 125 and the incline of the surface 124 cause the inserts to pass continuously and progressively down hill to the right in FIG. 17 as indicated by the arrow therein. The continuous feeding causes many inserts to pass along the full length of the comb 121 following which such inserts are recycled back to the feeder bowl 142.

Assuming that there are inserts initially in the pockets 122 as shown in FIG. 17, such inserts in the pockets cooperate with the vertical abutment surfaces 126 at the ends of teeth 127 to support the inserts in the row against lateral movement, whereby the inserts continue to travel to the right as is desired. It is emphasized that should the inserts stop moving, they tend to tip over, particularly since they are relatively top heavy due to the increased thickness of metal (FIG. 10) at the upper portions of the inserts as distinguished from the lower portions thereof.

Upon operation of cylinder 134 by control means 136 to lift the pins 128 simultaneously, the pins lift the inserts up into the suction tubes as stated above. While the pins 128 are in their upper positions, shown in phantom lines in FIGS. 18 and 19, the inserts in the row adjacent the comb continue to move to the right as indicated by the arrow. Those inserts which are adjacent the pockets 122 may move partially therein but they cannot fully enter the pockets due to the presence of the upwardly shifted pins 128. After partially entering the pockets, the inserts move out of the pockets and continue moving in the row (not in the comb or in the pockets), particularly since the corners of the teeth 127 are beveled to prevent the inserts from hanging up on such corners. It follows that the pins 128 not only lift the inserts 21 but operate as gates to prevent full entrance of the inserts into the pockets, so that the inserts continue moving in the row and do not tip over.

After the pins 128 shift down to their lower positions, out of the pockets 122, the inserts in the row thereof and which are registered with the various pockets pass laterally therein due to the incline shown in FIG. 19 and due to the vibration of plate 125. Those inserts which do not enter the pockets continue moving in the row. The operation is thus repeated and the pins lifted to cause the pocketed inserts to be lifted up to the suction tube ends.

It is pointed out that the pins cannot lift any inserts which may be disposed in pockets in upright as distinguished from inverted condition. Thus, the mechanism operates to prevent inserts from entering the ends of tubes 83 open end first instead of nose first which is desired.

The feeding of the inserts through the suction tubes 83 one at a time, as distinguished from passing stacks of inserts through the tubes, is highly important in that nesting of the inserts is prevented.

Because the inserts are drawn through the tubes by suction, not by pressure, the inserts may be readily lifted for far greater distances. Thus, and as indicated above, the insert-feeding mechanism 61–61a may be disposed at a relatively low elevation, for example on the floor next to the molding machine, and is isolated therefrom except by the plastic tubes 83 which bend sufficiently to prevent transmission of shock from the molding machine into the feeder bowl. Thus, the feeder bowl and feeder mechanism is not jarred to thereby disturb the extremely light and top-heavy inserts.

BRIEF SUMMARY OF OPERATION

Let it be assumed that the apparatus is initially in the condition shown in FIGS. 1 and 5, the mold being fully open. Let it also be assumed that there are inserts 21 located in all of the nests 88 in vertical transfer plate 69.

The control circuit associated with the molding press then gives a signal to the loader control means 73 (FIG. 1), causing the cylinder 64 to shift the vertical transfer plate 69 downwardly to the position shown in FIG. 2. The valve 95 (FIG. 11) is then operated to the position opposite the one shown, causing the pressure source 96 to be connected to nests 88 to thereby propel the inserts 21 through the air to the ends of core pins 40, as shown in FIG. 10, following which the valve 95 shifts back to its vacuum position causing vacuum to be applied to all the nests.

The loader control means 73 (FIG. 1) then operates to shift vertical transfer plate 69 upwardly to the position of FIGS. 1 and 4.

The molder control means 34 (FIG. 1) is then operated to cause the cylinder 32 to close the press to the position shown in FIGS. 6 and 9, the core pins 40 entering the mold cavities 38 and effecting depression of the sealing plunger means 58 as described relative to FIGS. 8 and 9.

Assuming that the fluidics 59 (FIG. 5) then senses that all inserts are properly positioned, the injection control means 36 (FIG. 2) is operated to inject plastic through the elements 35 (FIG. 2), 53 (FIG. 14), 42 and 43 into cavities 38 to fill the same. The cooled core pins 40 and the cooling means associated with the mold element 37 then cause rapid solidification of the plastic.

During injection of the plastic, the fingers 128 (FIGS. 17-19) are lifted by cylinder 134 under the control of control means 136 to lift inserts 21 out of pockets 122 into suction tubes 83. There is then suction present in such tubes due to the fact that the lug 82 on moving platen 31 then engages pin 81 (FIG. 4) to shift the horizontal transfer plate 76 sufficiently far to cause the tube ends to seal around the nests 88 as shown in FIG. 12. The suction applied through passage 89 then operates through tubes 83 to suck the inserts into the nests.

At the end of the predetermined time sufficient to cause solidification of the plastic, the press is opened under the control of molder control means 34 (FIG. 1), following which the stripper control means 49 (FIG. 2) operates the cylinder 47 to shift the stripper plate 46 forwardly and effect ejection of parts from the press as described relative to FIGS. 7 and 14-16. In the event that the stripping is not effective, the next downward movement of the vertical transfer plate 69 operates through lugs S to insure that stripping occurs.

The cycle is then repeated, it being emphasized that air is continuously sucked through the core pins 40 at all times (except when there are inserts mounted over the openings 101 in the ends thereof) to effect cooling of the core pins as is important for minimized cycle time.

References to "vertical" and "horizontal" in the appended claims, relative to the vertical and horizontal transfer plates, are not intended to be limitations relative to such directions since such claims are not avoidable by changing the orientation of the molding apparatus and the associated loader. The words "vertical" and "horizontal" are used, in connection with such plates, to generally indicate relative directions.

We claim:

1. Apparatus for effecting molding of objects having inserts therein, which comprises:

mold means including first and second mold elements adapted to open and close relative to each other, at least one of said mold elements incorporating means for positioning an insert to be incorporated in the molded object, transfer means having an insert-ejecting portion adapted to be registered with said positioning means, means to open said mold means and means to move said transfer means into a predetermined position between said first and second mold elements at which said insert-ejecting portion is registered with and spaced from said positioning means, means operative while said transfer means is in said predetermined position to eject an insert from said insert-ejecting portion and to cause said insert to fly through the air across the space between said insert-ejecting portion and said positioning means for positioning by said positioning means, means to move said transfer means away from said predetermined position between said first and second mold elements and means to close said mold means, and means to introduce molding material into said mold while said insert is positioned by said positioning means.

2. Apparatus for feeding small objects, which comprises:

a vertical transfer means having seat means in an exterior surface portion thereof, means to move said vertical transfer means generally vertically between a loading position and a discharge position, a horizontal transfer means disposed in the vicinity of said vertical transfer means when the latter is in said loading position, means to move said horizontal transfer means generally horizontally between a first position at which said horizontal and vertical transfer means are clear of each other and a second position at which said horizontal transfer means is adjacent said vertical transfer means when the latter is in said loading position, conduit means having end portions associated with said horizontal transfer means for movement therewith, said end portions of said conduit means seating respectively around said seat means on said vertical transfer means when said horizontal transfer means is in said second position, suction means to apply suction to said seat means, whereby suction is also applied through said seat means to said conduit means when said horizontal transfer means is in said second position, means to introduce small objects into said conduit means, through the end portions thereof remote from said first-mentioned end portions, when said horizontal transfer means is in said second position, whereby said objects are sucked through said conduit means to said seat means and are retained on said seat means by suction, said small objects being inserts for an article being molded in an injection molding press, at least one mold in said press including positioning means for said inserts, means provided to apply suction to said positioning means, and means to apply air pressure to said seat means in said vertical transfer means when in said discharge position, thereby causing ejection of said inserts from said seat means and consequent positioning thereof by said positioning means.

3. A horizontal transfer means for a feeding system associated with an injection molding press, which comprises:
a plate having a plurality of holes therethrough,
a plurality of flexible tubes having end portions extended, respectively, through said holes,
means to mount said tube end portions in such relationship to said plate that the extreme ends of said tubes project short distances from one side of said plate,
said extreme ends being adapted to seat sealingly around openings in a vertical transfer means, and means to shift said plate horizontally to first engage said tube ends with said vertical transfer means, and then disengage said tube ends from said vertical transfer means, said means to shift said plate horizontally comprising an actuating element mounted on the moving platen of said press for operation when said press closes.

4. The invention as claimed in claim 3, in which spring bias means are provided to shift said plate away from said vertical transfer means, in which said horizontal transfer means is associated with an injection molding press, and in which means are provided on said press to shift said tube ends into engagement with said vertical transfer means in response to closing of said press.

5. Apparatus for effecting molding of objects having inserts therein, which comprises:
mold means including first and second mold elements adapted to open and cose relative to each other,
at least one of said mold elements incorporating means for positioning an insert to be incorporated in the molded object,
transfer means having an insert-ejecting portion adapted to be registered with said positioning means,
means to open said mold means and means to move said transfer means into a predetermined position at which said insert-ejecting portion is registered with and spaced from said positioning means,
means operative while said transfer means is in said predetermined position to eject an insert from said insert-ejecting portion and to cause said insert to fly through the air across the space between said insert-ejecting portion and said positioning means for positioning by said positioning means,
means to move said transfer means away from said predetermined position and means to close said mold means,
means to introduce molding material into said mold while said insert is positioned by said positioning means, each of said inserts being generally cup shaped,
said positioning means comprising the end of a core element in said mold means,
said end being shaped generally correspondingly to the inner surface of said cup-shaped insert whereby said cup-shaped insert seats snugly on said end, and means to apply suction to said end whereby to maintain said insert thereon due to a differential in air pressure across said insert.

6. Apparatus for effecting molding of objects having inserts therein which comprises:
mold means including first and second mold elements adapted to open and close relative to each other, at least one of said mold elements incorporating means for positioning an insert to be incorporated in the molded object,
transfer means having an insert-ejecting portion adapted to be registered with said positioning means,
means to open said mold means and means to move said transfer means into a predetermined position at which said insert-ejecting portion is registered with and spaced from said positioning means,
means operative while said transfer means is in said predetermined position to eject an insert from said insert-ejecting portion and to cause said insert to fly through the air across the space between said insert-ejecting portion and said positioning means for positioning by said positioning means, said means to eject an insert comprising means to apply air pressure suddenly to said insert-ejecting portion while said transfer means is in said predetermined position,
means to move said transfer means away from said predetermined position and means to close said mold means, and
means to introduce molding material into said mold while said insert is positioned by said positioning means.

7. Apparatus for effecting molding of objects having inserts therein, which comprises:
mold means including first and second mold elements adapted to open and close relative to each other, at least one of said mold elements incorporating means for positioning an insert to be incorporated in the molded object,
transfer means having an insert-ejecting portion adapted to be registered with said positioning means,
means to open said mold means and means to move said transfer means into a predetermined position at which said insert-ejecting portion is registered with and spaced from said positioning means,
means operative while said transfer means is in said predetermined position to eject an insert from said insert-ejecting portion and to cause said insert to fly through the air across the space between said insert-ejecting portion and said positioning means for positioning by said positioning means,
means to move said transfer means away from said predetermined position and means to close said mold means,
means to introduce molding material into said mold while said insert is positioned by said positioning means,
each of said inserts being generally cup-shaped,
said transfer means being so constructed that said insert-ejecting portion is a nest adapted to receive an insert in outwardly-facing position,
said means to eject said insert comprising means to apply air pressure to said nest to cause said insert to fly through the air to said positioning means, and means to apply suction to said nest to maintain said insert therein.

8. The invention as claimed in claim 7, in which said positioning means is the end of a generally tubular core pin in said mold means, said core pin end being shaped to receive said cup-shaped insert thereover, and in which means are provided to apply suction substantially continuously to said core pin to thereby cool said core pin prior to the time said insert is mounted thereover, and to maintain said insert in mounted condition after said insert seats on said core pin end.

9. Apparatus for molding elongated hollow plastic objects having inserts in the ends thereof, which comprises:

mold means including a first mold element defining an elongated mold cavity having a mouth at one end thereof, said mold means also including a second mold element in the form of a cantilevered elongated core adapted to be inserted through said mouth into said mold cavity, said core being hollow and having an opening in the distal end thereof whereby air may be sucked therethrough, means to change said mold means from a closed condition at which said core is inserted in said cavity to an open condition at which said core is outside of said cavity and said distal end is spaced a substantial distance from said mouth, transfer means adapted to receive one of said inserts, means to move said transfer means from a loading position to a discharge position between said distal end and said mouth, means to load one of said inserts into said transfer means when said transfer means is in said loading position, means to eject said insert from said transfer means and to position said insert on said distal end over said opening therein when said transfer means is in said discharge position and said mold means is in said open condition, means to apply suction to the proximal end of said core to thereby draw cooling air into said opening and through said core for cooling thereof, and to maintain said insert in seated position on said distal end due to the air pressure differential between the exterior surface of said insert and the interior surface thereof, and means to introduce hot plastic into said mold cavity while said mold means is in said closed condition.

10. The invention as claimed in claim 9, in which each of said inserts is generally cup shaped, in which said transfer means is provided with a nest to receive said cup-shaped insert in outwardly-facing position, and in which said means to eject said insert comprises an air blast applied to said nest.

11. The invention as claimed in claim 10, in which means are provided to apply suction to said nest to maintain said insert therein prior to the time said air blast is applied.

12. The invention as claimed in claim 9, in which said transfer means is spaced from said distal end when in said discharge position, and in which said means to eject said insert is adapted to propel the same through the air to said distal end.

13. The invention as claimed in claim 9, in which second transfer means are provided to transfer said insert into said first-mentioned transfer means, and in which vibratory loading means are provided to load said second transfer means.

14. Apparatus for molding elongated hollow plastic objects having generally cup-shaped inserts in the ends thereof, which comprises:

mold means including a first mold element defining an elongated mold cavity having a mouth at one end thereof, said mold means also including a second mold element in the form of a cantilevered elongated core adapted to be inserted through said mouth into said mold cavity, said core being hollow and having an opening in the distal end thereof whereby air may be sucked therethrough, means to change said mold means from a closed condition at which said core is inserted in said cavity to an open condition at which said core is outside of said cavity and said distal end is spaced a substantial distance from said mouth, transfer means, said transfer means having a nest in the outer portion thereof and adapted to receive one of said inserts in such orientation that the mouth of said insert faces outwardly, means to apply suction to said nest whereby to maintain said insert in said nest due to the resulting differential in air pressure, means to move said transfer means from a loading position adjacent said mold means to a discharge position between said distal end and said mouth, said insert when in said discharge position being registered with and spaced from said distal end, means to load one of said inserts into said transfer means when said transfer means is in said loading position, means to eject said insert from said transfer means and to position said insert on said distal end and over said opening when said transfer means is in said discharge position and said mold means is in said open condition, said ejector means including means to apply air pressure between said insert and said nest to thereby propel said insert through the air until the insert is seated on said distal end, means to apply suction to the proximal end of said core to thereby draw cooling air into said opening and through said core for cooling thereof, and to maintain said insert in seated position on said distal end due to the air pressure differential between the exterior surface of said insert and the interior surface thereof, and means to introduce hot plastic into said mold cavity while said mold means is in said closed condition.

15. The invention as claimed in claim 14, in which said means to load said transfer means comprises second transfer means to move the end of a conduit into sealing engagement with said nest whereby the suction applied to said nest also applies suction to said conduit, and in which said means to load said transfer means further comprises supply means to effect automatic supply of said inserts one-at-a-time to the end of said conduit remote from said nest whereby said insert is sucked through said conduit and then maintained by suction in said nest.

16. The invention as claimed in claim 15, in which said supply means comprises vibratory feeder and pocket means to vibrate said insert to an inverted position below and spaced from said end of said conduit remote from said nest, and means to lift said insert into said remote conduit end.

* * * * *